United States Patent
Uchida et al.

(10) Patent No.: US 7,397,220 B2
(45) Date of Patent: Jul. 8, 2008

(54) CONNECTION MEMBER AND BATTERY PACK

(75) Inventors: Yasunori Uchida, Aichi (JP); Yasushi Ido, Aichi (JP); Isao Takada, Aichi (JP); Daisuke Shinoda, Aichi (JP); Katsuya Hadano, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 148 days.

(21) Appl. No.: 11/091,706

(22) Filed: Mar. 29, 2005

(65) Prior Publication Data

US 2005/0212477 A1 Sep. 29, 2005

(30) Foreign Application Priority Data

Mar. 29, 2004 (JP) .............................. P2004-097039

(51) Int. Cl.
*H02J 7/00* (2006.01)

(52) U.S. Cl. ........................ 320/116; 320/112; 429/100

(58) Field of Classification Search ................ 320/107, 320/110, 112, 116, 113, 119, 120; 429/99, 429/100, 101
See application file for complete search history.

(56) References Cited

U.S. PATENT DOCUMENTS

| | | | | |
|---|---|---|---|---|
| 1,433,455 A * | 10/1922 | Horton | ........................ | 320/107 |
| 2,622,233 A * | 12/1952 | Field | ........................... | 320/107 |
| 4,117,206 A * | 9/1978 | Plust et al. | ................... | 429/101 |
| 4,581,570 A * | 4/1986 | Mejia | ........................... | 320/103 |
| 4,619,873 A * | 10/1986 | Ishikura et al. | ............... | 429/48 |
| 4,714,662 A * | 12/1987 | Bennett | ........................ | 429/27 |
| 4,863,812 A * | 9/1989 | Ueda et al. | ...................... | 429/9 |
| 5,008,162 A * | 4/1991 | Tomantschger et al. | ....... | 429/34 |
| 5,459,389 A * | 10/1995 | Fujiwara et al. | ............. | 320/111 |
| 5,578,392 A * | 11/1996 | Kawamura | ..................... | 429/99 |
| 5,717,256 A * | 2/1998 | Okumura et al. | .............. | 307/66 |
| 5,731,683 A * | 3/1998 | Nakanishi | .................... | 320/111 |
| 5,969,529 A * | 10/1999 | Eiraku et al. | ................. | 324/433 |
| 5,977,746 A * | 11/1999 | Hershberger et al. | ........ | 320/112 |
| 6,137,260 A * | 10/2000 | Wung et al. | .................. | 320/116 |
| 6,204,632 B1 * | 3/2001 | Nierescher et al. | .......... | 320/116 |
| 6,265,845 B1 * | 7/2001 | Bo et al. | ...................... | 320/113 |
| 6,485,861 B2 * | 11/2002 | Takeshita et al. | .............. | 429/99 |
| 2003/0129466 A1 * | 7/2003 | Sugita et al. | ................... | 429/26 |
| 2003/0193317 A1 * | 10/2003 | Shimamura et al. | .......... | 320/116 |
| 2004/0021442 A1 * | 2/2004 | Higashino | .................... | 320/112 |
| 2004/0081882 A1 * | 4/2004 | Ontl | ............................. | 429/96 |

FOREIGN PATENT DOCUMENTS

| | | |
|---|---|---|
| JP | A-2000-348696 | 12/2000 |
| JP | A-2002-015716 | 1/2002 |

* cited by examiner

*Primary Examiner*—Adolf Berhane
*Assistant Examiner*—Diao M'baye
(74) *Attorney, Agent, or Firm*—Posz Law Group, PLC

(57) ABSTRACT

Metal cell tanks including secondary cells respectively are connected to one another by connection members. For example, a connection member has: an insulation portion interposed between adjacent cell tanks for keeping the cell tanks electrically insulated from each other; an one-end holding portion extending from one end of the insulation portion for holding one end portion of one of the adjacent cell tanks; and an opposite-end holding portion extending from the other end of the insulation portion for holding the other end portion of the other of the adjacent cell tanks.

6 Claims, 6 Drawing Sheets

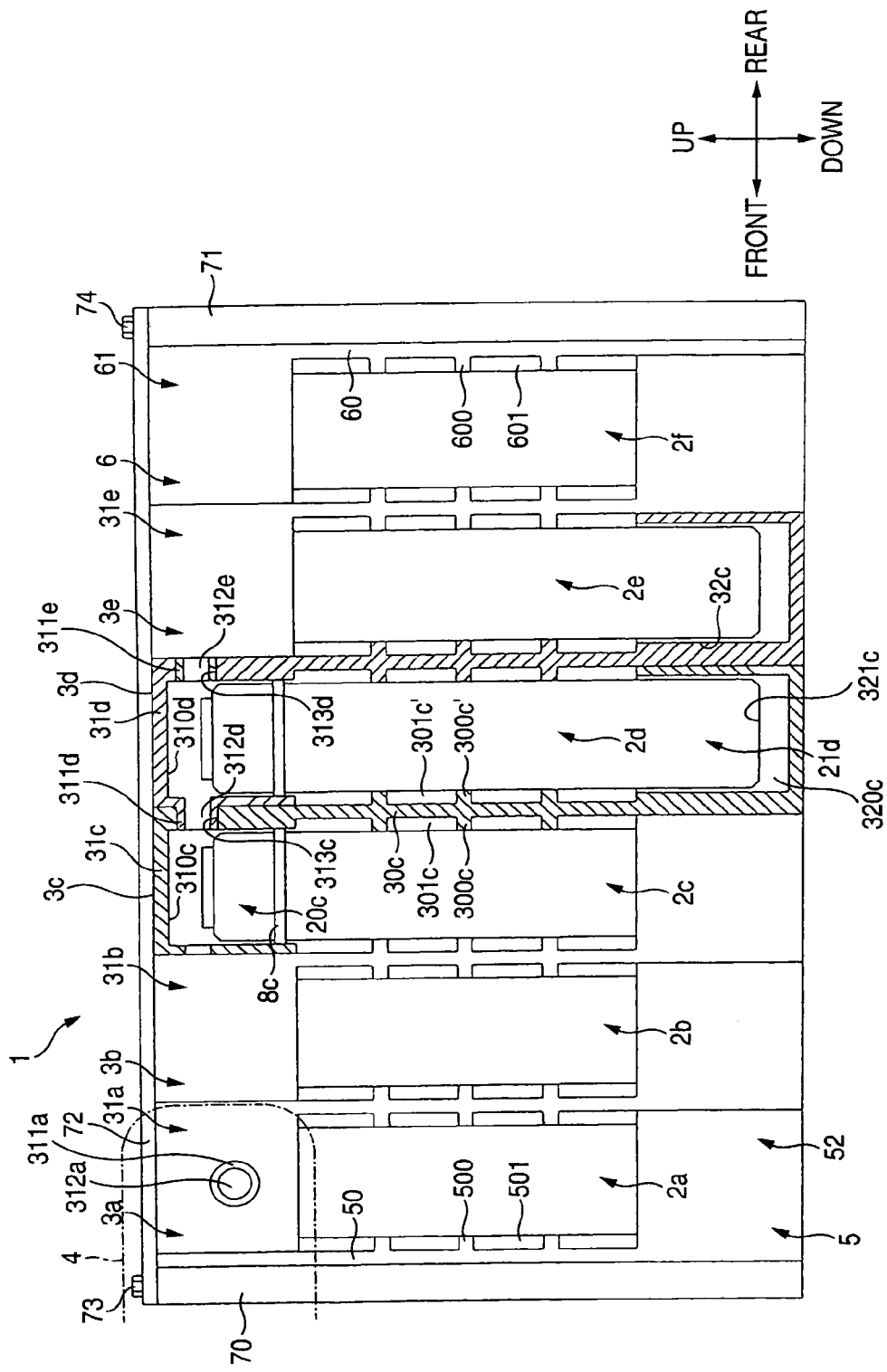

CONNECTION MEMBER AND BATTERY PACK

BACKGROUND OF THE INVENTION

1. Field of the Invention

The present invention relates to connection members by which secondary cells served as an electric source for driving a hybrid vehicle etc. are integrated into a module, as well as a battery pack using the connection members.

2. Description of the Related Art

In a battery pack, a plurality of secondary cells are disposed side by side in order to obtain a required output. A casing partitioned into a plurality of sub-chambers is used so that the secondary cells can be disposed side by side at regular intervals in the casing. When the casing is made of metal, it is necessary to keep adjacent secondary cells electrically insulated from each other. Therefore, the outer surface of each secondary cell is covered with an electrically insulating film or sheet (e.g. see Japanese Patent Publication No. JP 2000-348696A and Japanese Patent Publication No. JP 2002-15716A).

The number of secondary cells, that is, the number of sub-chambers in the casing is however decided on the basis of the electric power for driving a subject. For this reason, it is necessary to produce casings in accordance with subjects different in driving power.

Moreover, it is troublesome to cover the outer surface of each secondary cell with an electrically insulating film or sheet. That is, electrode terminals of adjacent secondary cells need to be electrically connected to each other. For this reason, it is necessary to avoid covering the electrode terminal portion of each secondary cell when the outer surface of the secondary cell is wound with the electrically insulating film or sheet. Particularly when the shape of the secondary cell is rectangular, winding tension is apt to be concentrated on corners of the secondary cell. For this reason, it is difficult to wind the electrically insulating film or sheet under uniform tension.

SUMMARY OF THE INVENTION

A connection member and a battery pack according to the invention are accomplished in consideration of the aforementioned problems. Accordingly, an object of the invention is to provide connection members and a battery pack using the connection members in which the number of secondary cells disposed can be adjusted in accordance with an output requirement and in which adjacent secondary cells can be relatively easily kept electrically insulated from each other.

(1) To solve the aforementioned problems, the invention provides a connection member for connecting a plurality of metal cell tanks including secondary cells respectively, having: an insulation portion interposed between adjacent ones of the cell tanks for keeping the adjacent cell tanks electrically insulated from each other; a first-end holding portion extending from one end of the insulation portion for holding one end portion of one of the adjacent cell tanks; and a second-end holding portion extending from the other end of the insulation portion for holding the other end portion of the other of the adjacent cell tanks.

That is, the connection member according to the invention is used for connecting adjacent cell tanks to each other. The connection member is interposed between adjacent cell tanks. That is, the connection member is connected to two cell tanks so that one cell tank, the connection member and the other cell tank are arranged in this order. For this reason, the number of cell tanks, that is, the number of secondary cells disposed can be changed when the number of connection members is changed. That is, the number of secondary cells disposed can be adjusted in accordance with the demand for an output for driving a subject.

The insulation portion is further interposed between adjacent cell tanks. For this reason, adjacent cell tanks made of metal can be kept electrically insulated from each other. Accordingly, the distance between adjacent cell tanks can be narrowed. That is, the size of the battery pack can be reduced. Because the insulation portion is interposed between adjacent cell tanks, it is unnecessary to cover the outer surface of each cell tank with the electrically insulating film or sheet as in JP 2000-348696A and JP 2002-15716A. For this reason, the troublesome winding operation can be dispensed with.

The cell tanks are made of metal. If the cell tanks were made of resin, there is a possibility that heat-radiating characteristic of the secondary cells will be lowered because the heat-transfer coefficient of the resin is small. If heat-radiating characteristic is lowered, the cell reaction advances unevenly between the inner portion and the outer portion of each electrode. As a result, the life of each secondary cell is shortened. In this respect, the cell tanks connected by the connection members according to the invention are made of metal large in heat-transfer coefficient. Accordingly, the cell tanks are high in heat-radiating characteristic. As described above, when the connection members according to the invention are used, both high heat-radiating characteristic and high electrical insulation can be combined successfully.

(2) Preferably, the first-end holding portion is an upper end holding portion in which an upper end portion of one of the adjacent cell tanks is inserted; and the second-end holding portion is a lower end holding portion in which a lower end portion of the other of the adjacent cell tanks is inserted. According to this configuration, the connection member is connected to two cell tanks so that the upper end portion of one cell tank, the upper end holding portion of the connection member, the lower end holding portion of the connection member and the lower end portion of the other cell tank are arranged in this order.

(3) Preferably, the upper end holding portion includes a gas chamber for receiving gas leaked out of the upper end portion, and an exhaust hole communicating with the gas chamber for releasing the gas.

Gas is generated from the upper end portion of each secondary cell, for example, because of repeated charging and discharging, overcharging, etc. The gas is leaked out of the cell tank from the upper end portion of the cell tank. The upper end portion is held in the upper end holding portion of the connection member. From this point of view, a gas chamber and an exhaust hole are disposed in the upper end holding portion in this configuration. Accordingly, the gas leaked from the upper end portion can be put out of the connection member through the gas chamber and the exhaust hole.

(4) Preferably, a sealing member for restraining gas from being leaked out of the gas chamber is interposed between the upper end portion and the upper end holding portion. According to this configuration, gas can be restrained from being leaked out from the other portions than the exhaust hole. The gas leaked out of each cell tank is concentratedly put out from the exhaust hole. Thus, in accordance with this configuration, the gas can be treated easily.

(5) Preferably, the lower end holding portion includes an electrolyte chamber for reserving electrolytes leaked out of the lower end portion. Electrolytes are enclosed in each cell tank. Conceivably, there is a possibility that adjacent cell tanks will be short-circuited through the electrolytes leaked out of a cell tank for some reason. In this respect, the electrolyte chamber is formed in the lower end holding portion of the connection member having this configuration. According to this configuration, the electrolytes leaked out of a cell tank are reserved in the electrolyte chamber even if the electrolytes were leaked out of the cell tank. Thus, adjacent cell tanks can be restrained from being short-circuited through the leaked electrolytes.

(6) Preferably, the insulation portion includes convex portions protruding toward the cell tanks. According to this configuration, a space corresponding to the convex portions can be secured between the insulation portion and each of the adjacent cell tanks. When this space is used as a ventilation path, the heat-radiating characteristic of the cell tank, that is, the heat-radiating characteristic of the secondary cell can be improved more greatly. When apical surfaces of the convex portions are brought into contact with the outer surface of each cell tank, the cell tank can be held. There is a possibility that each cell tank will be swollen by gas generated, for example, because of repeated charging and discharging, overcharging, etc. Even in this case, in accordance with this configuration, the swelling of the cell tank can be suppressed by the apical surfaces of the convex portions.

(7) To solve the aforementioned problems, the invention also provides a battery pack having: a number N ($N \geq 2$) of metal cell tanks including secondary cells respectively and disposed side by side; and a number N−1 of connection members each including an insulation portion for connecting the (n−1)-th ($2 \leq n \leq N$) and n-th cell tanks among the N cell tanks to each other while keeping the (n−1)-th and n-th cell tanks electrically insulated from each other, an upper end holding portion which extends from an upper end of the insulation portion and in which an upper end portion of the (n−1)-th cell tank is inserted, and a lower end holding portion which extends from a lower end of the insulation portion and in which a lower end of the n-th cell tank is inserted.

The battery pack according to the invention has N cell tanks, and N−1 connection members. Each connection member is interposed between adjacent cell tanks. That is, cell tanks and connection members are connected to one another so alternately that the (n−1)-th cell tank, the (n−1)-th connection member and the n-th cell tank are arranged in this order. For this reason, the number of cell tanks, that is, the number of secondary cells to be disposed can be changed when the number of connection members is changed. Accordingly, the number of secondary cells to be disposed can be adjusted in accordance with the demand for an output for driving a subject. Conversely, one battery pack can be used in common to a plurality of subjects different in driving power when the number of secondary cells, that is, the number of cell tanks to be disposed is changed. For example, when the battery pack according to the invention is used as a power supply for driving a hybrid vehicle, the number of cell tanks to be disposed in the battery pack can be adjusted so that the battery pack can be used in common to various types of cars different in driving power. Accordingly, reduction in cost can be achieved in terms of sharing of parts.

Each insulation portion is interposed between adjacent cell tanks. For this reason, adjacent cell tanks made of metal can be kept electrically insulated from each other. Accordingly, the distance between adjacent cell tanks can be narrowed. That is, the size of the battery pack can be reduced. Because the insulation portion is interposed between adjacent cell tanks, it is unnecessary to cover the outer surface of each cell tank with the electrically insulating film or sheet as in Patent Documents 1 and 2. Thus, the troublesome winding operation can be dispensed with.

The cell tanks are made of metal. If the cell tanks were made of resin, there is a possibility that heat-radiating characteristic of the secondary cells will be lowered because the heat-transfer coefficient of the resin is small. If heat-radiating characteristic is lowered, the cell reaction advances unevenly between the inner portion and the outer portion of each electrode. As a result, the life of each secondary cell, hence, the life of the battery pack is shortened. In this respect, the cell tanks in the battery pack according to the invention are made of metal large in heat-transfer coefficient. Accordingly, the cell tanks are high in heat-radiating characteristic. That is, when the cell tanks and the insulation portions of the connection members are used, both high heat-radiating characteristic and high electrical insulation can be combined successfully.

(8) Preferably, the battery pack further has an exhaust tube for forming an exhaust path communicating with the exhaust hole. According to this configuration, the gas put out from the exhaust holes can be batch-processed by the exhaust tube.

(9) Preferably, the battery pack further has: a first end member including a first end insulation portion for keeping the first cell tank electrically insulated, and a first end lower end holding portion which extends from a lower end of the first end insulation portion and in which the lower end portion of the first cell tank is inserted; and a last end member including a last end insulation portion for keeping the N-th cell tank electrically insulated, and a last end upper end holding portion which extends from an upper end of the last end insulation portion and in which the lower end portion of the N-th cell tank is inserted.

One connection member connects the upper end portion of the (n−1)-th cell tank and the lower end portion of the n-th cell tank to each other. For this reason, the initial end-side surface and lower end portion of the first cell tank as an initial end and the terminal end-side surface and upper end portion of the N-th cell tank as a terminal end are revealed. From this point of view, in accordance with this configuration, the initial end-side surface of the first cell tank is protected by the first end insulation portion of the first end member. The lower end portion of the first cell tank is covered with the first end lower end holding portion of the first end member. The terminal end-side surface of the N-th cell tank is protected by the last end insulation portion of the last end member. The upper end portion of the N-th cell tank is covered with the last end upper end holding portion of the last end member. According to this configuration, the upper and lower end portions of all cell tanks constituting the battery pack can be protected.

According to the invention, there can be provided connection members and a battery pack using the connection members in which the number of secondary cells to be disposed can be adjusted in accordance with an output requirement and in which adjacent secondary cells can be relatively easily kept electrically insulated from each other.

BRIEF DESCRIPTION OF THE DRAWINGS

FIG. 6 is a lengthwise side view of a battery pack according to a second embodiment.

DETAILED DESCRIPTION OF THE PREFERRED EMBODIMENTS

Embodiments of a battery pack according to the invention will be described below. Incidentally, the following description serves also as the description of connection members according to the invention.

First Embodiment

Figure 1:
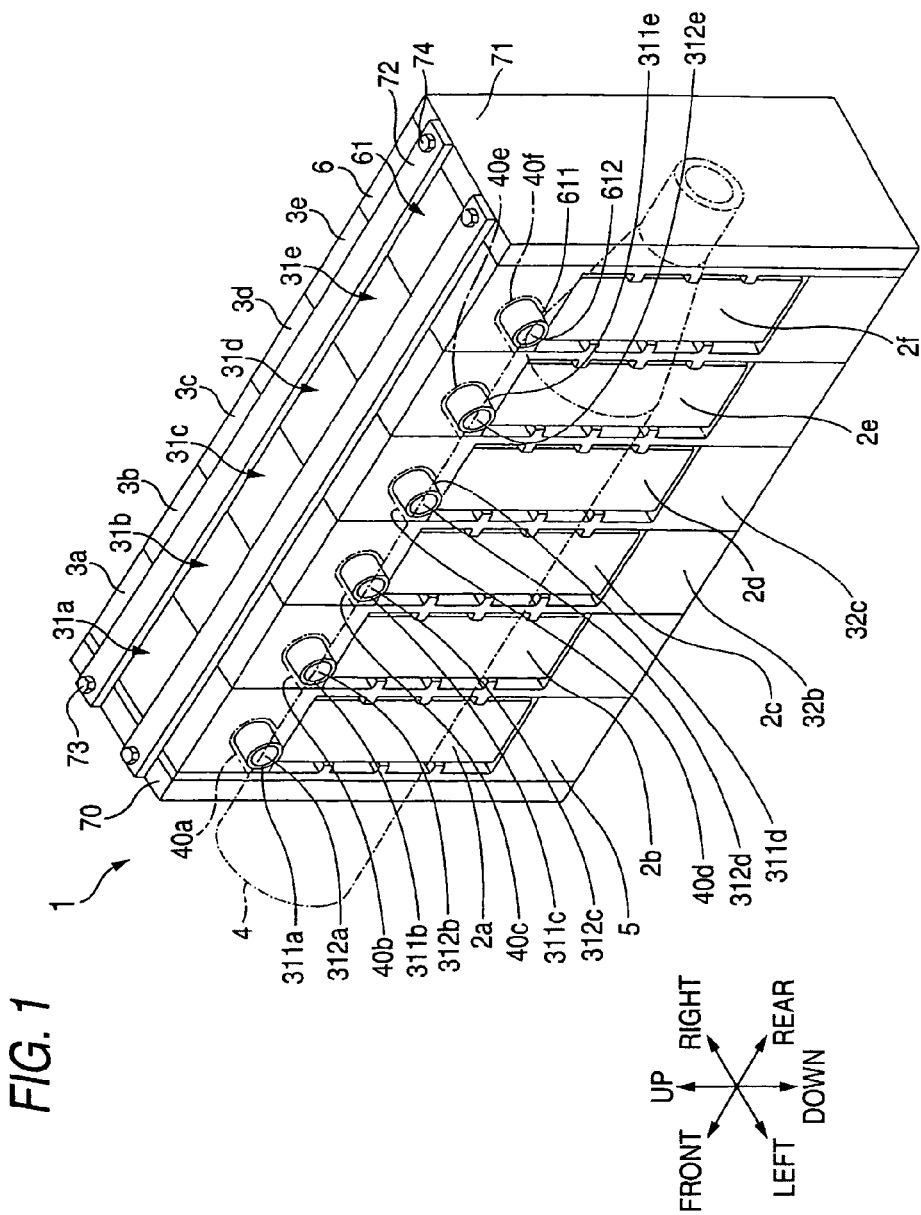
FIG. 1 is a perspective view of a battery pack according to a first embodiment.
Figure 2:
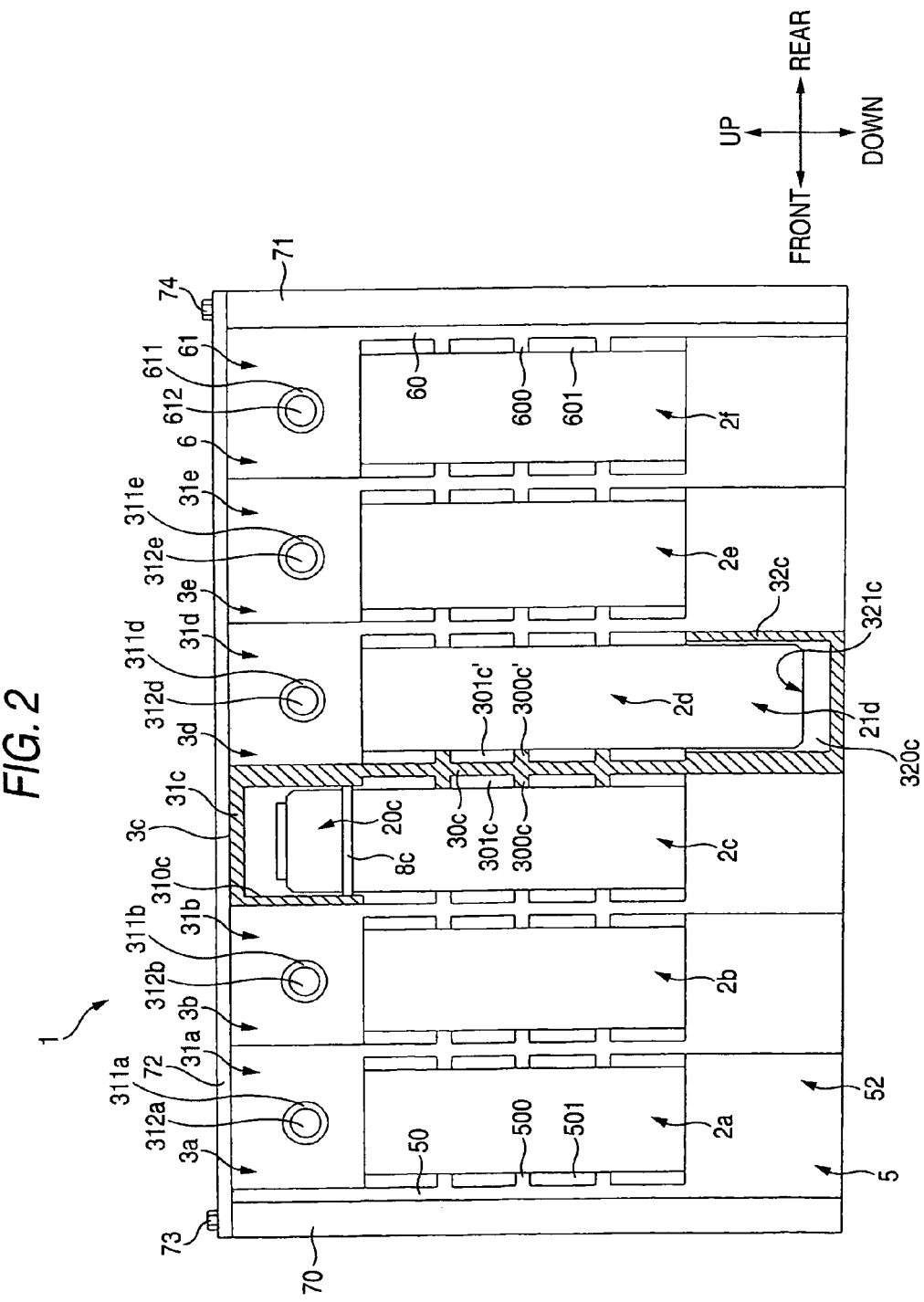
FIG. 2 is a lengthwise side view of the battery pack.

The configuration of the battery pack according to this embodiment will be described first. FIG. 1 is a perspective view of the battery pack according to this embodiment. FIG. 2 is a lengthwise side view (partly in section) of the battery pack. Incidentally, an exhaust tube is not shown in FIG. 2 for the sake of description's convenience.

As shown in FIGS. 1 and 2, the battery pack 1 according to the embodiment mainly has cell tanks $2a$ to $2f$, connection members $3a$ to $3e$, an exhaust tube 4, a first end member 5, a last end member 6, a first end plate 70, a last end plate 71, and belts 72.

Each of the cell tanks $2a$ to $2f$ is made of metal and shaped like a rectangular parallelepiped. Nickel-hydrogen secondary cells (not shown) are stored in the cell tanks $2a$ to $2f$ respectively.

Each of the connection members $3a$ to $3e$ is made of a highly electrically insulating resin and substantially shaped like an "S" figure. The connection member $3c$ representative of the connection members $3a$ to $3e$ will be described below. Accordingly, the description of the other connection members $3a$, $3b$, $3d$ and $3e$ will be omitted.

The connection member $3c$ (shown as a section in FIG. 2) includes an electrically insulating plate $30c$, an upper end holding portion $31c$, and a lower end holding portion $32c$. The electrically insulating plate $30c$ is shaped like a rectangular plate spreading up, down, left and right (hereinafter, directions are defined based on the frontward direction). The electrically insulating plate $30c$ is included in an insulation portion in the invention. The electrically insulating plate $30c$ is interposed between the cell tanks $2c$ and $2d$. Ribs $300c$ and $300c'$ (exaggeratedly shown for the sake of description's convenience) protrude from front and rear surfaces of the electrically insulating plate $30c$. The ribs $300c$ and $300c'$ are included in convex portions in the invention. Among the ribs, three ribs $300c$ in total are disposed on the front surface of the electrically insulating plate $30c$. The ribs $300c$ extend substantially horizontally. Apical surfaces of the ribs $300c$ abut on the rear surface of the cell tank $2c$. Each ventilation path $301c$ is formed between adjacent ones of the ribs $300c$. An air stream is supplied into the ventilation paths $301c$. On the other hand, three ribs $300c'$ in total are disposed on the rear surface of the electrically insulating plate $30c$ so as to be back to back with the ribs $300c$. The ribs $300c'$ extend substantially horizontally. Apical surfaces of the ribs $300c'$ abut on the front surface of the cell tank $2d$. Each ventilation path $301c'$ is formed between adjacent ones of the ribs $300c'$. An air stream is supplied into the ventilation paths $301c'$.

The upper end holding portion $31c$ is shaped like a rectangular parallelepiped box opened downward. The upper end holding portion $31c$ protrudes from an upper edge of the electrically insulating plate $30c$ and extends forward. The upper end holding portion $31c$ has a gas chamber $310c$, and an exhaust pipe $311c$. An upper end portion $20c$ of the cell tank $2c$ is inserted into the upper end holding portion $31c$. Incidentally, a relief valve (not shown) is disposed in the upper end portion $20c$ so that hydrogen gas generated from the nickel-hydrogen secondary cell because of overcharge or the like can be leaked out of the cell tank $2c$. A seal ring $8c$ made of rubber is interposed between an inner surface of the upper end holding portion $31c$ and an outer surface of the upper end portion $20c$. The gas chamber $310c$ is formed in the inside of the upper end holding portion $31c$ and over the upper end portion $20c$. The gas chamber $310c$ is kept airtight by the seal ring $8c$ elastically touching both the inner surface of the upper end holding portion $31c$ and the outer surface of the upper end portion $20c$.

The exhaust pipe $311c$ is cylindrical and protrudes from a left surface of the upper end holding portion $31c$. An exhaust hole $312c$ is formed in the inside of the exhaust pipe $311c$. The exhaust hole $312c$ and the gas chamber $310c$ communicate with each other.

The lower end holding portion $32c$ is shaped like a rectangular parallelepiped box opened upward. The lower end holding portion $32c$ protrudes from a lower edge of the electrically insulating plate $30c$ and extends backward. The lower end holding portion $32c$ has an electrolyte chamber $320c$. A lower end portion $21d$ of the cell tank $2d$ is inserted into the lower end holding portion $32c$. The lower end portion $21d$ is supported by a cell tank support rib $321c$ erected from the inner surface of the lower end holding portion $32c$. Because the cell tank support rib $321c$ supports the lower end portion $21d$, the electrolyte chamber 320 is formed between the inner surface of the lower end holding portion $32c$ and the outer surface of the lower end portion $21d$.

The first end member 5 is made of a highly electrically insulating resin and substantially shaped like an "L" figure. The first end member 5 includes a first end electrically insulating plate 50, and a first end lower end holding portion 52. The first end electrically insulating plate 50 is included in a first end insulation portion in the invention. The first end electrically insulating plate 50 is shaped like a rectangular plate spreading up, down, left and right. The first end electrically insulating plate 50 is disposed in front of the forefront, that is, first cell tank $2a$. Ribs 500 protrude from a rear surface of the first end electrically insulating plate 50. The number of the ribs 500 disposed is three in total. The ribs 500 extend substantially horizontally. Apical surfaces of the ribs 500 abut on the front surface of the cell tank $2a$. Each ventilation path 501 is formed between adjacent ones of the ribs 500. An air stream is supplied into the ventilation paths 501.

The first end lower end holding portion 52 is shaped like a rectangular parallelepiped box opened upward. The first end lower end holding portion 52 protrudes from a lower edge of the first end electrically insulating plate 50 and extends backward. The first end lower end holding portion 52 has an electrolyte chamber (not shown). A lower end portion of the cell tank $2a$ is inserted into the first end lower end holding portion 52. The electrolyte chamber is formed between the inner surface of the first end lower end holding portion 52 and the outer surface of the lower end portion of the cell tank $2a$.

The last end member 6 is made of a highly electrically insulating resin and substantially shaped like an inverted "L" figure. The last end member 6 has a last end electrically insulating plate 60, and a last end upper end holding portion 61. The last end electrically insulating plate 60 is included in a last end insulation portion in the invention. The last end electrically insulating plate 60 is shaped like a rectangular plate spreading up, down, left and right. The last end electrically insulating plate 60 is disposed in the rear of the rearmost, that is, last cell tank $2f$. Ribs 600 protrude from a front surface of the last end electrically insulating plate 60. The number of the ribs 600 disposed is three in total. The ribs 600 extend substantially horizontally. Apical surfaces of the ribs 600 abut on the rear surface of the cell tank $2f$. Each ventilation path 601 is formed between adjacent ones of the ribs 600. An air stream is supplied into the ventilation paths 601.

The last end upper end holding portion 61 is shaped like a rectangular parallelepiped box opened downward. The last end upper end holding portion 61 protrudes from an upper edge of the last end electrically insulating plate 60 and extends forward. The last end upper end holding portion 61 has a gas chamber (not shown), and an exhaust pipe 611. An upper end portion of the cell tank 2f is inserted into the last end upper end holding portion 61. A seal ring (not shown) made of rubber is interposed between the inner surface of the last end upper end holding portion 61 and the outer surface of the upper end portion of the cell tank 2f. The gas chamber is formed in the inside of the last end upper end holding portion 61 and over the upper end portion. The gas chamber is kept airtight by the seal ring elastically touching both the inner surface of the last end upper end holding portion 61 and the outer surface of the upper end portion of the cell tank 2f.

The exhaust pipe 611 is cylindrical and protrudes from a left surface of the last end upper end holding portion 61. An exhaust hole 612 is formed in the inside of the exhaust pipe 611. The exhaust hole 612 and the gas chamber communicate with each other.

The exhaust tube 4 (shown as a one-dot chain line in FIG. 1) is shaped like a bottomed cylinder extending forward and backward. An exhaust path (not shown) is formed in the inside of the exhaust tube 4. The exhaust tube 4 is connected to exhaust processing equipment (not shown). The exhaust tube 4 is provided side by side with upper end holding portions 31a to 31e of the connection members 3a to 3e and the last end upper end holding portion 61 of the last end member 6. The exhaust tube 4 includes branch pipe portions 40a to 40f extending right. The branch pipe portion 40a is connected to an exhaust pipe 311a of the connection member 3a. The branch pipe portion 40b is connected to an exhaust pipe 311b of the connection member 3b. The branch pipe portion 40c is connected to an exhaust pipe 311c of the connection member 3c. The branch pipe portion 40d is connected to an exhaust pipe 311d of the connection member 3d. The branch pipe portion 40e is connected to an exhaust pipe 311e of the connection member 3e. Accordingly, the exhaust path of the exhaust tube 4 and exhaust holes 312a to 312e communicate with one another. On the other hand, the branch pipe portion 40f is connected to the exhaust pipe 611 of the last end member 6. Accordingly, the exhaust path of the exhaust tube 4 and the exhaust hole 612 communicate with each other.

The first end plate 70 is made of iron and shaped like a rectangular plate spreading up, down, left and right. The first end plate 70 is disposed in front of the first end member 5.

The last end plate 71 is made of iron and shaped like a rectangular plate spreading up, down, left and right. The last end plate 71 is disposed in the rear of the last end member 6.

Each of the belts 72 is made of iron and shaped like a long plate extending forward and backward. The belts 72 are disposed along the upper surfaces of the upper end holding portions 31a to 31e of the connection members 3a to 3e and the upper surface of the last end upper end holding portion 61 of the last end member 6. The belts 72 are provided left and right, that is, the number of the belts 72 disposed is two in total. Front ends of the belts 72 are screwed on the upper surface of the first end plate 70 by bolts 73. Similarly, rear ends of the belts 72 are screwed on the upper surface of the last end plate 71 by bolts 74. The cell tanks 2a to 2f, the connection members 3a to 3e, the first end member 5 and the last end member 6 are kept connected by the belts 72, the first end plate 70 and the last end plate 71.

Figure 3:
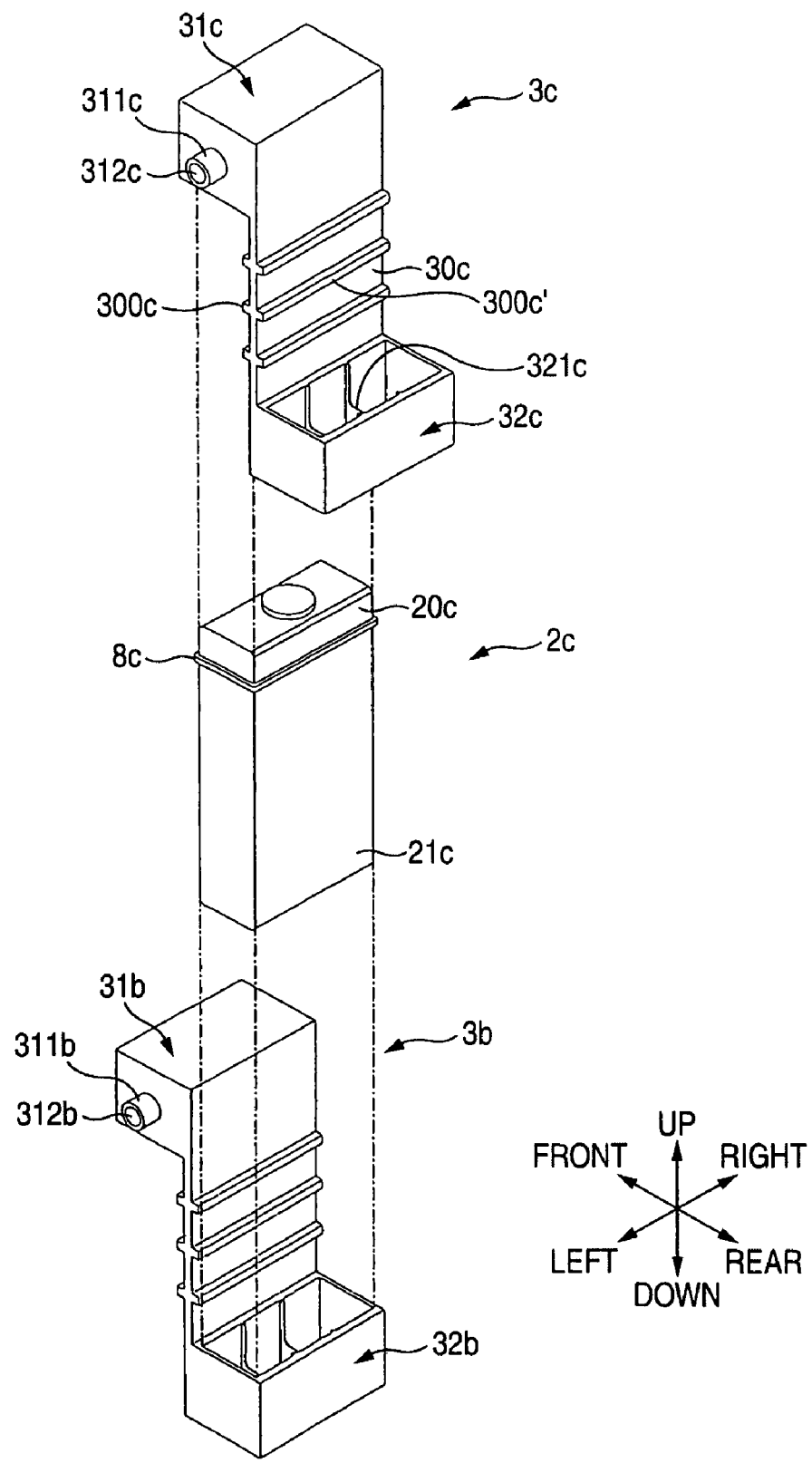
FIG. 3 is an exploded perspective view showing a cell tank and connection members as part of the battery pack.

Next, a method of assembling the battery pack according to the embodiment will be described. FIG. 3 is an exploded perspective view showing a cell tank and connection members as part of the battery pack according to this embodiment. As shown on FIG. 3, the upper end portion 20c of the cell tank 2c is forced into the upper end holding portion 31c of the connection member 3c through the seal ring 8c. When the upper end portion 20c is positioned by the upper end holding portion 31c, the ribs 300c of the connection member 3c abut on the rear surface of the cell tank 2c. On the other hand, the lower end portion 21c of the cell tank 2c is inserted into the lower end holding portion 32b of the connection member 3b.

Figure 4:
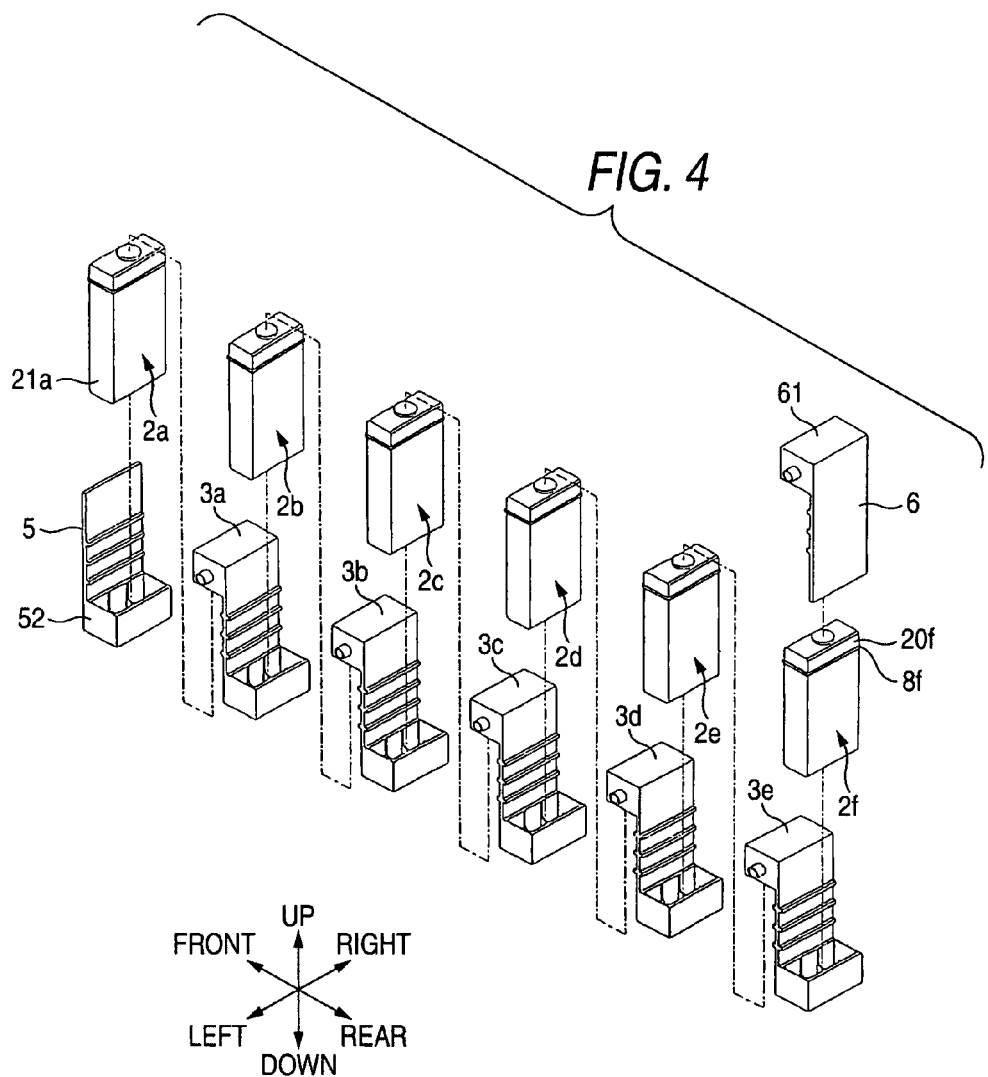
FIG. 4 is an exploded perspective view showing all cell tanks and all connection members in the battery pack.

FIG. 4 is an exploded perspective view showing all cell tanks and connection members in the battery pack according to this embodiment. As shown in FIG. 4, the aforementioned operation is carried out for all the cell tanks 2a to 2f and all the connection members 3a to 3e. The lower end portion 21a of the cell tank 2a is inserted into the first end lower end holding portion 52 of the first end member 5. On the other hand, the upper end portion 20f of the cell tank 2f is forced into the last end upper end holding portion 61 of the last end member 6 through the seal ring 8f. That is, the cell tanks 2a to 2f, the connection members 3a to 3e, the first end member 5 and the last end member 6 are connected to one another as if a picture were drawn with a single stroke of the brush in the following order: first end member 5→cell tank 2a→connection member 3a→cell tank 2b→connection member 3b→cell tank 2c→connection member 3c→cell tank 2d→connection member 3d→cell tank 2e→connection member 3e→cell tank 2f→last end member 6.

Figure 5:
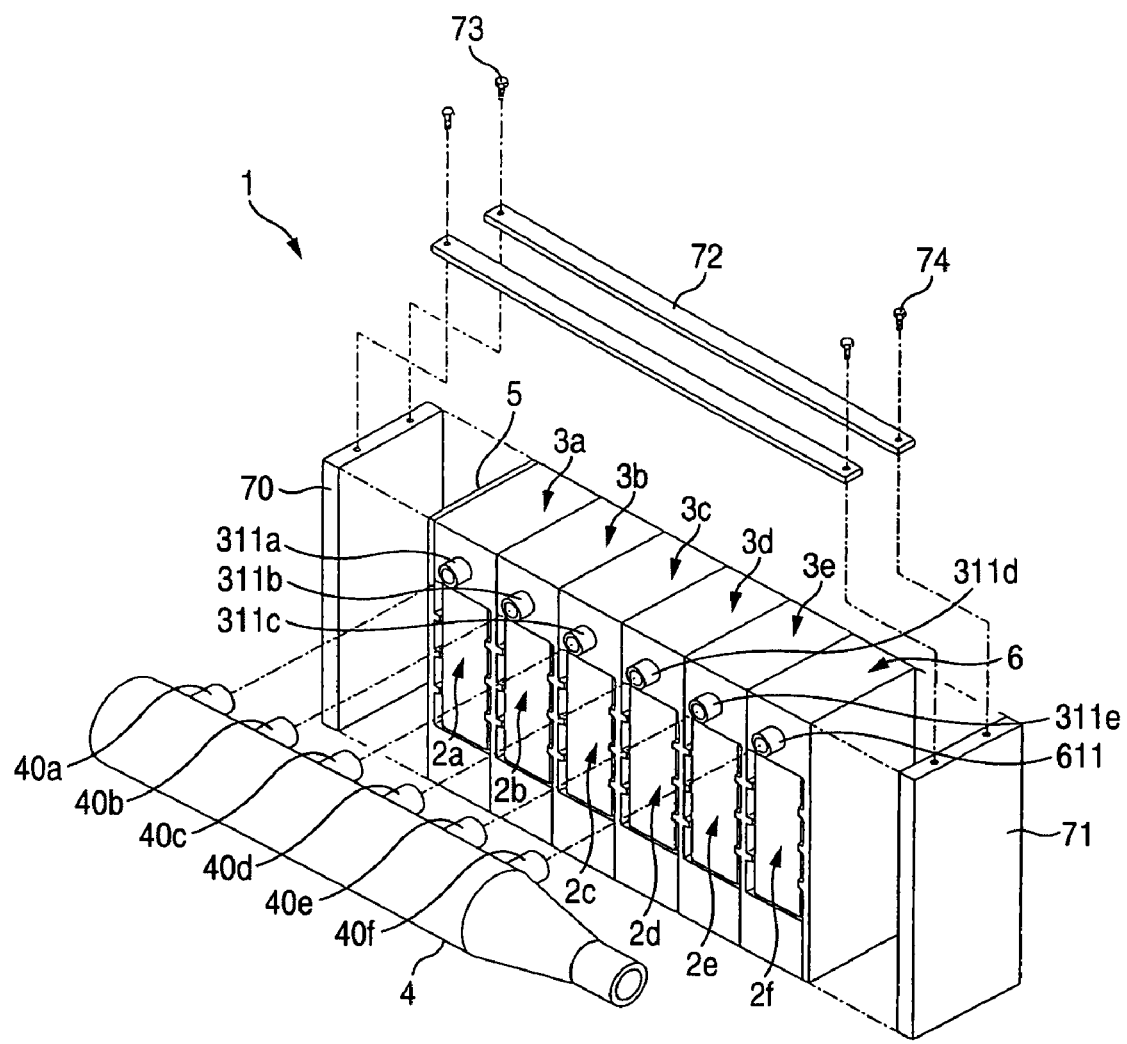
FIG. 5 is an exploded perspective view of the battery pack.

FIG. 5 is an exploded perspective view of the battery pack according to this embodiment. After all the cell tanks 2a to 2f, all the connection members 3a to 3e, the first end member 5 and the last end member 6 are connected to one another, the exhaust tube 4 is mounted. Specifically, the branch pipe portion 40a is fitted onto the exhaust pipe 311a of the connection member 3a, the branch pipe portion 40b is fitted onto the exhaust pipe 311b of the connection member 3b, the branch pipe portion 40c is fitted onto the exhaust pipe 311c of the connection member 3c, the branch pipe portion 40d is fitted onto the exhaust pipe 311d of the connection member 3d, the branch pipe portion 40e is fitted onto the exhaust pipe 311e of the connection member 3e, and the branch pipe portion 40f is fitted onto the exhaust pipe 611 of the last end member 6. The first end plate 70 is disposed in front of the first end member 5. Similarly, the last end plate 71 is disposed in the rear of the last end member 6. The front ends of the belts 72 are fixed to the first end plate 70 by the bolts 73. The rear ends of the belts 72 are fixed to the last end plate 71 by the bolts 74. A connected set of the cell tanks 2a to 2f, the connection members 3a to 3e, the first end member 5 and the last end member 6 is fixed while clamped back and forth by the first end plate 70 and the last end plate 71. In this manner, the battery pack 1 according to this embodiment is assembled.

Next, the function and effect of the battery pack 1 with the connection members 3a to 3e according to this embodiment will be described. In the battery pack 1 according to this embodiment, when the number of connection members 3a to 3e is changed, the number of cell tanks 2a to 2f to be disposed, that is, the number of nickel-hydrogen secondary cells to be disposed can be changed. That is, the number of nickel-hydrogen secondary cells to be disposed can be adjusted in accordance with an output demand for a subject to be driven by the battery pack.

Each electrically insulating plate (e.g. electrically insulating plate 30c) is interposed between adjacent cell tanks (e.g. cell tanks 2c and 2d) (see FIG. 2). For this reason, the cell tanks made of metal can be kept electrically insulated from one another. Accordingly, the distance between adjacent cell tanks can be narrowed. That is, the size of the battery pack 1 can be reduced. Because the electrically insulating plate 30c is interposed between the adjacent cell tanks, it is unnecessary to cover the outer surface of each cell tank with an electrically insulating film or an electrically insulating sheet. Thus, no complex winding operation is required.

The cell tanks 2a to 2f are made of metal. Even if the cell tanks 2a to 2f were made of resin, there is a possibility that heat-radiating characteristic of the nickel-hydrogen secondary cells will be lowered because the heat-transfer coefficient of the rein is small. If heat-radiating characteristic is lowered, the cell reaction advances unevenly between the inner portion of electrodes and the outer portion thereof. For this reason, the life of the nickel-hydrogen secondary cells is shortened. In this respect, the cell tanks 2a to 2f in the battery pack 1 according to this embodiment are made of metal having a large heat-transfer coefficient. Accordingly, the cell tanks 2a to 2f have high heat-radiating characteristic. As described above, in the battery pack 1 according to this embodiment, both high heat-radiating characteristic and high electrical insulation can be combined with each other successfully.

In each connection member (e.g. connection member 3c) according to this embodiment, the gas chamber 310c and the exhaust hole 312c are disposed in the upper end holding portion 31c. For this reason, in the connection member according to this embodiment, hydrogen gas leaked out of the upper end portion 20c of the cell tank 2c can be led into the exhaust tube 4.

The seal ring 8c is interposed between the inner surface of the upper end holding member 31c and the outer surface of the upper end portion 20c of the cell tank 2c. For this reason, hydrogen gas can be restrained from being leaked through a gap between the inner surface of the upper end holding portion 31c and the outer surface of the upper end portion 20c.

In each connection member (e.g. connection member 3c) according to this embodiment, the electrolyte chamber 320c is disposed in the lower end holding portion 32c. For this reason, even if electrolytes were leaked out of the cell tank 2d, the leaked electrolytes can be reserved in the electrolyte chamber 320c. Accordingly, the cell tanks can be restrained from being short-circuited through the electrolytes.

In each connection member (e.g. connection member 3c) according to this embodiment, the ribs 300c and 300c' protrude from the front and rear surfaces of the electrically insulating plate 30c. For this reason, even if the cell tank 2c expanded, the expansion can be suppressed by the ribs 300c. Similarly, even if the cell tank 2d expanded, the expansion can be suppressed by the ribs 300c'. In addition, the cell tank 2c can be held by the ribs 300c from the back. Similarly, the cell tank 2d can be held by the ribs 300c' from the front. In this manner, all the ribs of the connection members 3a to 3e, the ribs 500 of the first end member 5 and the ribs 600 of the last end member 6 can cooperate with one another to suppress the expansion of the cell tanks 2a to 2f and hold the cell tanks 2a to 2f from the front and the back.

Each ventilation path 301c is kept between adjacent ribs (e.g. ribs 300c). An air stream can be imported into the ventilation paths 301c to improve the heat-radiating characteristic of the cell tank 2c, that is, the nickel-hydrogen secondary cell.

In the battery pack 1 according to this embodiment, the exhaust tube 4 is disposed. Accordingly, hydrogen gases generated from the cell tanks 2a to 2f can be batch-processed. In the battery pack 1 according to this embodiment, the first end member 5 and the last end member 6 are disposed. For this reason, the front and rear surfaces and upper and lower end portions of all the cell tanks 2a to 2f constituting the battery pack 1 can be protected.

In addition, the electrolyte chamber is disposed in the first end lower end holding portion 52 of the first end member 5. For this reason, there is a low possibility that the cell tanks will be short-circuited even if electrolytes were leaked out of the cell tank 2a. The gas chamber and the exhaust hole are disposed in the last end upper end holding portion 61 of the last end member 6. For this reason, hydrogen gas leaked out of the cell tank 2f can be led into the exhaust tube 4. The seal ring 8f is interposed between the inner surface of the last end upper end holding portion 61 and the outer surface of the upper end portion 20f of the cell tank 2f. For this reason, hydrogen gas can be restrained from being leaked out of a gap between the inner surface of the last end upper end holding portion 61 and the outer surface of the upper end portion 20f.

Second Embodiment

The points of difference of this embodiment from the first embodiment is in that the respective connection members and the last end member are connected to one another through exhaust pipes, and in that only the exhaust pipe of the forefront connection member is connected to the exhaust tube. Accordingly, only the points of difference will be described below.

FIG. 6 is a lengthwise side view (partly in section) of a battery pack according to this embodiment. Incidentally, parts like those in FIG. 2 are referred to by numerals the same as those in FIG. 2. As shown in FIG. 6, a connection hole 313c is formed in the rear surface of the upper end holding portion 31c of the connection member 3c. On the other hand, an exhaust pipe 311d protrudes from the front surface of the upper end holding portion 31d of the connection member 3d. The exhaust pipe 311d is forced into the connection hole 313c through a seal ring (not shown) By the forcing-in, the gas chamber 310c, the exhaust hole 312d and the gas chamber 310d communicate with one another.

Similarly, a connection hole 313d is formed in the rear surface of the upper end holding portion 31d of the connection member 3d. On the other hand, an exhaust pipe 311e protrudes from the front surface of the upper end holding portion 31e of the connection member 3e. The exhaust pipe 311e is forced into the connection hole 313d through a seal ring (not shown). By the forcing-in, the gas chamber 310d, the exhaust hole 312e and the gas chamber 310e in the upper end holding portion 31e communicate with one another.

As described above, the respective gas chambers in the connection members 3a to 3e and the last end member 6 communicate with one another through the exhaust holes. Only the exhaust pipe 311a of the forefront connection member 3a is connected to the exhaust tube 4 (shown as a one-dot chain line in FIG. 6). Accordingly, hydrogen gases leaked out of all the connection members 3a to 3e and the last end member 6 are led into the exhaust tube 4 through the exhaust hole 312a.

The battery pack 1 according to this embodiment has the same function and effect as those of the battery pack according to the first embodiment. In the battery pack 1 according to this embodiment, the total length of the exhaust tube 4 can be reduced. In addition, because the exhaust pipes are fitted into the connection holes respectively (e.g. the exhaust pipe 311d is fitted into the connection hole 313c), the connection members can be firmly connected to one another and the connection member 3e and the last end member 6 can be firmly connected to each other.

Others

While embodiments of the battery pack with connection members according to the invention have been described above, the invention is not particularly limited to the aforementioned embodiments. Various changes or modifications that can be conceived by those skilled in the art may be made.

In the aforementioned embodiments, nickel-hydrogen secondary cells are used as secondary cells. For example, lithium ion secondary cells, nickel-cadmium secondary cells, or the like, may be used as the secondary cells. In the aforementioned embodiments, six cell tanks $2a$ to $2f$ in total are disposed. The number of cell tanks $2a$ to $2f$, that is, the number of secondary cells to be disposed is not particularly limited. The number of cell tanks can be adjusted suitably in accordance with the output demand for a subject to be driven by the battery pack.

What is claimed is:

1. A connection member for connecting a plurality of metal cell tanks, comprising:
   each metal cell tank having a first end portion, a second end portion and plurality secondary cells;
   the connection member having a shape and configuration that holds the secondary cells which provide an electric source for driving a vehicle,
   wherein:
   an insulation portion is interposed between adjacent metal cell tanks for keeping the adjacent metal cell tanks electrically insulated from each other;
   a first-end holding portion extends from a first end of said insulation portion and holds the first end portion of one of the adjacent metal cell tanks;
   a second-end holding portion extends from a second end of said insulation portion and holds the second end portion of the other of the adjacent metal cell tanks; and
   said first-end holding portion and said second-end holding portion are arranged back to back on said insulating portion and extend in opposite directions.

2. A connection member according to claim 1, wherein:
   said first-end holding portion is an upper end holding portion in which an upper end portion of one of the adjacent metal cell tanks is inserted; and
   said second-end holding portion is a lower end holding portion in which a lower end portion of the other of the adjacent metal cell tanks is inserted.

3. A connection member for connecting a plurality of metal cell tanks, comprising:
   each metal cell tank having a first end portion, a second end portion and plurality secondary cells;
   the connection member having a shape and configuration that holds the secondary cells which provide an electric source for driving a vehicle,
   wherein:
   an insulation portion is interposed between adjacent metal cell tanks for keeping the adjacent metal cell tanks electrically insulated from each other;
   a first-end holding portion extends from a first end of said insulation portion and holds the first end portion of one of the adjacent metal cell tanks, said first-end holding portion being an upper end holding portion in which an upper end portion of one of the adjacent metal cell tanks is inserted;
   a second-end holding portion extends from a second end of said insulation portion and holds the second end portion of the other of the adjacent metal cell tanks, said second-end holding portion being a lower end holding portion in which a lower end portion of the other of the adjacent metal cell tanks is inserted; and
   said upper end holding portion includes a gas chamber for receiving gas leaked out of said upper end portion of said metal cell tanks, and an exhaust hole communicating with said gas chamber for releasing said gas.

4. A connection member according to claim 3, wherein a sealing member for restraining gas from being leaked out of said gas chamber is interposed between said upper end portion of said metal cell tanks and said upper end holding portion.

5. A connection member according to claim 2, wherein said lower end holding portion includes an electrolyte chamber for reserving electrolytes leaked out of said lower end portion.

6. A connection member according to claim 1, wherein said insulation portion includes convex portions protruding toward the metal cell tanks.

* * * * *